G. A. NUNNELEY.
MACHINE FOR TREATING EGGS.
APPLICATION FILED NOV. 23, 1912.
1,068,695.
Patented July 29, 1913.
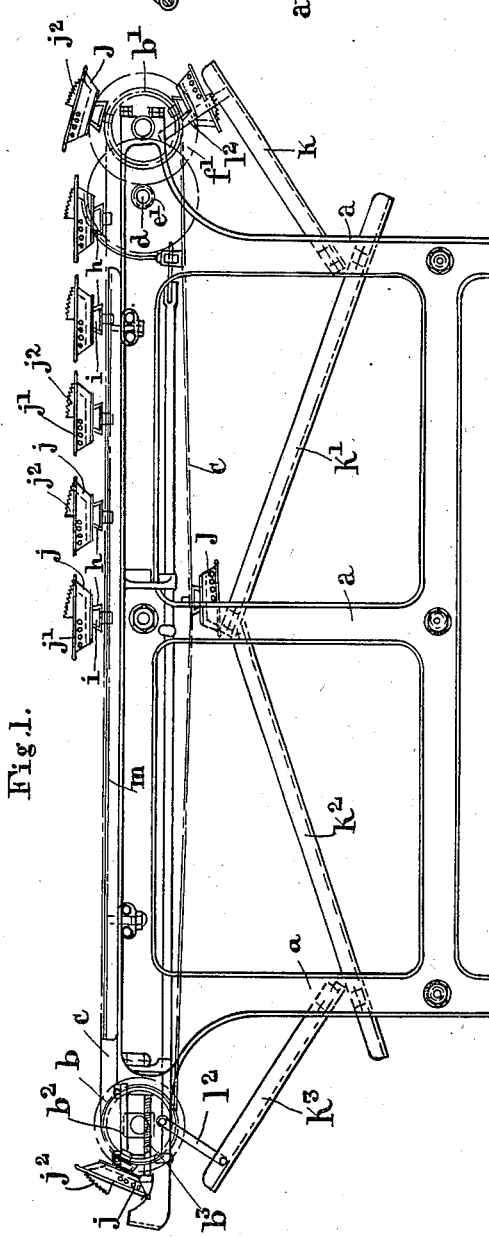
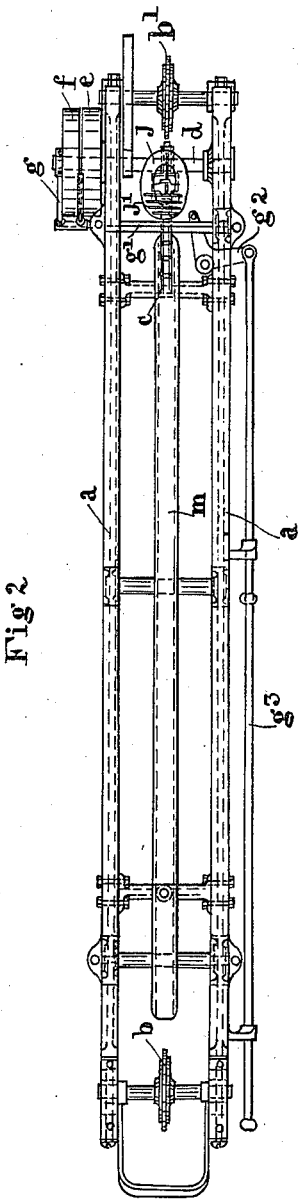
Witnesses
Inventor George Arthur Nunneley
by Attorney

UNITED STATES PATENT OFFICE.

GEORGE ARTHUR NUNNELEY, OF BERMONDSEY, LONDON, ENGLAND, ASSIGNOR TO PEEK, FREAN & COMPANY, LIMITED, AND JOSEPH BAKER & SONS, LIMITED, BOTH OF LONDON, ENGLAND.

MACHINE FOR TREATING EGGS.

1,068,695.        Specification of Letters Patent.        Patented July 29, 1913.

Application filed November 23, 1912. Serial No. 733,188.

*To all whom it may concern:*

Be it known that I, GEORGE ARTHUR NUNNELEY, a subject of the King of England, residing at Bermondsey, London, in England, have invented certain new and useful Improvements in Machines for Treating Eggs, of which the following is a specification.

This invention relates to a new or improved machine for treating eggs, more particularly for testing the quality of eggs which have been broken so that their contents may be used for example in the manufacture of biscuits, cakes and all kinds of pastry or for other purposes, and the object is to provide a simple and efficient machine for this purpose by which any egg contents which are stale or bad can be readily detected and removed, so that the bulk is not contaminated, and in which there is practically no waste whatever of good egg contents.

The machine includes an endless conveyer on which are detachably mounted a series of containers or trays into which the egg contents are separately deposited by an operative by breaking the shell on a device with which each tray is provided, another operator positioned at a distance away from the first then inspecting the contents and detecting by the sense of smell whether such contents are good or bad. In the latter case this operative detaches the tray containing the bad egg contents and throws same away or otherwise disposes thereof, whereupon trays containing good contents are reversed and their contents discharged onto inclined chutes or equivalents from which they drain or pass into suitable receptacles.

An embodiment of the machine is represented in the accompanying drawings, in which—

Figure 1 is a side elevation thereof, Fig. 2 a plan view with parts removed, and Fig. 3 an end view also with parts removed for the sake of clearness of illustration.

Mounted at each end of a suitable frame $a$ is a pulley or sprocket wheel $b$ $b^1$ about which passes an endless chain or conveyer $c$, one of the pulleys viz. $b^1$, being driven to actuate said conveyer chain from a shaft $d$ by means of gearing $e^1$ $f^1$ interposed between the shaft $d$ and the pulley $b^1$, said shaft $d$ having mounted thereon fast and loose pulleys $e$ $f$. $g$ designates a belt fork operated by rod $g^1$, bell crank $g^2$ and rod $g^3$ from the opposite end of the machine. The sprocket wheel $b$ at this end is shown as mounted in bearings $b^2$ adjustable as by a screw $b^3$ for regulating the slack of the chain $c$.

At suitable distances apart on the chain $c$ are mounted spring clips $h$, preferably of dovetailed cross-section as shown, to detachably receive similarly shaped blocks $i$ on the bottoms of the trays $j$ so that the latter may be removed from the chain in a transverse direction. The trays are, for example, of elliptical form in plan as shown in Fig. 2 and have splayed sides. Each tray may have a partial perforated false bottom $j^1$ in the form of a grid or grating, and extending longitudinally down the center for part of the length of the tray is an upstanding serrated blade or knife $j^2$.

Below the lower run of the chain $c$ are a series of inclined draining chutes or ways $k$, $k^1$, $k^2$, $k^3$ adapted to discharge the contents of reversed trays on said lower run into suitable receptacles at each end of the machine, said chutes being suitably carried by brackets $l$ $l^1$ secured to the side frames of the machine and by stays $l^2$. The upper run of the chain $c$ is shown as engaging a longitudinal guide $m$ to prevent sagging and insure a straight course for the trays.

In the operation of the machine, an operative standing at the left hand end of the machine shown in Figs. 1 and 2 cracks the shells of the eggs on the blade or knife $j^2$ of a tray as it arrives at the horizontal position and empties the contents of different eggs separately into the trays in succession, placing the shell on the false bottom $j^1$ to drain, while a second operative standing at or about the middle of the length of the machine removes the shells and smells the contents of each tray in turn as said tray comes opposite, and should any contents be detected as stale or bad by such sense of smell, this second operative at once removes the tray containing said bad contents without the necessity of stopping the travel of the conveyer and disposes of said contents as may be desired, the tray being cleaned and afterward replaced on the chain. The trays containing fresh or good egg contents are reversed when passing to the lower run of the chain, said contents being thus discharged on to the chutes $k$ to $k^3$ and thoroughly drained throughout the whole return movement to the starting point, the entire contents being discharged at both ends of the machine from the chutes $k^1$ and $k^2$ into suitable receptacles.

The machine as above described has the following advantages over existing methods in which much waste is caused by breaking more than one egg into the same vessel thus causing several good eggs to be contaminated by one bad one, viz. firstly by breaking the eggs separately into different trays such contamination and consequent waste is eliminated; secondly, time is allowed for the egg-shell to drain during its transit through the machine; thirdly, no bad egg contents can easily pass the examining operative, thus again avoiding contamination of the bulk of the contents; fourthly, no waste of the whites of the eggs occurs owing to the use of the central blade on each tray, this waste being very considerable in existing methods in which the egg is broken on the side of a vessel; fifthly, the machine may be provided with an automatic checking or counting device to record the quantity of eggs dealt with so that piecework may be done more readily than by the existing method; and sixthly, the machine can be worked by girls and boys without possibility of waste.

I do not limit myself to the particular form and arrangement of parts constituting the machine above described and shown in the drawings, since the same may be varied within limits determined by the appended claims without departing from the spirit of the invention.

What I claim as my invention and desire to secure by Letters Patent of the United States is:—

1. A machine for treating eggs comprising an endless conveyer, a plurality of receptacles detachably mounted on said conveyer, and means for collecting the contents of reversed receptacles on the return run of said conveyer.

2. A machine for treating eggs comprising an endless conveyer, a plurality of receptacles detachably mounted on said conveyer, a member on each receptacle by contact with which the egg-shell may be broken, and means for collecting the contents of reversed receptacles on the return run of said conveyer.

3. A machine for treating eggs comprising an endless conveyer, a plurality of receptacles detachably mounted on said conveyer, a perforated false bottom within each receptacle, and means for collecting the contents of reversed receptacles on the return run of said conveyer.

4. A machine for treating eggs comprising an endless conveyer, a plurality of receptacles detachably mounted on said conveyer, a perforated false bottom within each receptacle, a central blade on each receptacle above said false bottom, and means for collecting the contents of reversed receptacles on the return run of said conveyer.

5. A machine for treating eggs comprising an endless conveyer, a plurality of receptacles detachably mounted on said conveyer for ready removal in a direction transverse to the travel of the conveyer, and means for collecting the contents of reversed receptacles on the return run of said conveyer.

6. A machine for treating eggs comprising an endless conveyer, a plurality of spring clips spaced at intervals on said conveyer, receptacles detachably mounted in said spring clips for ready removal in a direction transverse to the travel of the conveyer, a perforated false bottom within each receptacle, a central longitudinal blade on each receptacle above said false bottom, and means for collecting the contents of reversed receptacles on the return run of said conveyer.

7. A machine for treating eggs comprising an endless conveyer, a plurality of spring clips spaced at intervals on said conveyer, receptacles detachably mounted in said spring clips for ready removal in a direction transverse to the travel of the conveyer, a perforated false bottom within each receptacle, a central longitudinal blade on each receptacle above said false bottom, and a series of inclined chutes for collecting the contents of reversed receptacles on the return run of said conveyer.

In witness whereof I have signed this specification in the presence of two witnesses.

GEORGE ARTHUR NUNNELEY.

Witnesses:
 HERBERT D. JAMESON,
 O. J. WORTH.

Copies of this patent may be obtained for five cents each, by addressing the "Commissioner of Patents, Washington, D. C."